United States Patent [19]
Ramlohr et al.

[11] Patent Number: 4,494,181
[45] Date of Patent: Jan. 15, 1985

[54] CIRCUIT ARRANGEMENT FOR DETERMINING THE POLARITY AND MAGNITUDE OF THE LOAD CURRENT IN A REVERSIBLE D-C CONTROLLER OR CHOPPER

[75] Inventors: Franz Ramlohr; Werner Pohl; Walter Kölzer, all of Vienna, Austria

[73] Assignee: Siemens Aktiengesellschaft, Munich, Fed. Rep. of Germany

[21] Appl. No.: 449,757

[22] Filed: Dec. 14, 1982

[30] Foreign Application Priority Data

Dec. 21, 1981 [AT] Austria ................................ 5488/81

[51] Int. Cl.³ ............................................. H02M 7/02
[52] U.S. Cl. ........................................ 363/63; 318/65; 318/280; 318/293
[58] Field of Search .................. 318/65, 722, 280, 281, 318/293, 300; 363/63, 131, 132, 135, 136, 124

[56] References Cited
U.S. PATENT DOCUMENTS 4,146,827  3/1979  Krohn ............................. 363/136 X
4,301,496  11/1981 Schwarz .......................... 363/132 X
4,314,325  2/1982  Siebert ............................ 363/132 X

OTHER PUBLICATIONS

"Elektrie" 28 (1974), pp. 368-370 by M. Schulze, et al.

Primary Examiner—William M. Shoop
Attorney, Agent, or Firm—Kenyon & Kenyon

[57] ABSTRACT

A circuit arrangement for determining the polarity and the magnitude of the load current in a reversible d-c controller includes a bridge circuit comprising two pairs of bridge arms connected to opposite terminals of the voltage supply bus. Each pair of bridge arms connected to the same side of the supply bus form a bypass circuit connected across the load. Two diagonally disposed bridge arms each contain a primary winding of a current transformer having two primary windings connected in opposite winding phase. Load current normally flows through either pair of diagonally disposed bridge arms, but during pauses in the load drive, circulates in one of the two bypass circuits. Electronic switches in each of the bridge arms are controlled so that the load current circulates in successive bypass periods in an alternating pattern in the two bypass circuits. When current flows in a bypass circuit, a phase sensitive voltage is induced in the single secondary of the current transformer. Signals from the electronic switches in one of the bypass circuits are fed via digital logic circuitry to a further electronic switch which causes an operational amplifier to invert pulses from that bypass circuit alone. A pulse train having a polarity corresponding to the polarity of the load current is thereby obtained. In a further embodiment, a sample-and-hold stage for determining the magnitude and polarity of the load current is provided.

7 Claims, 4 Drawing Figures

CIRCUIT ARRANGEMENT FOR DETERMINING THE POLARITY AND MAGNITUDE OF THE LOAD CURRENT IN A REVERSIBLE D-C CONTROLLER OR CHOPPER

BACKGROUND OF THE INVENTION

The present invention relates to a circuit arrangement for determining the polarity of the load current in a reversible d-c controller or chopper having a bridge circuit which is connected across a supply voltage source, the bridge circuit comprising four bridge arms, each of which contains an antiparallel circuit comprising an electronic switch and a bypass diode. Two bypass circuits are each formed from the two bridge arms respectively connected to the same supply bus. A measuring sensor is provided in each of two diagonal bridge arms, and the electronic switches are controlled so that the load current circulates in successive bypass periods in an alternating pattern in the two bypass circuits.

Such a circuit arrangement is known, for instance, from the journal "Elektrie" 28 (1974), pages 368 to 370. In the known circuit arrangement, resistors which are connected to the bus with reference potential are provided as measuring sensors in two bridge arms. Although this cirucit arrangement can be used to determine the magnitude and polarity of the load current at zero potential, elaborate and expensive electronic circuitry is required for evaluating the signals obtained by the measuring sensors.

An object of the invention is to provide a circuit arrangement of the type mentioned above by which the polarity of the load current can be determined in a relatively simple and convenient manner.

SUMMARY OF THE INVENTION

This an other objects of the invention are achieved by providing a circuit arrangement including a current transformer having two primary windings as the measuring sensors, each primary winding of which is respectively connected in the opposite winding sense in two diagonal bridge arms of the four bridge arms. The secondary winding of the current transformer is connected across a load resistor and thence to the inverting and the non-inverting inputs of an operational amplifier, the output of which is fed back to the inverting input. The non-inverting input of the operational amplifier can be connected by an electronic switch to a reference potential. The electronic switch of the operational amplifier is closed via digital logic circuitry in every time interval in which the load current circulates in the same predetermined bypass circuit in dependence on the control signals for the electronic switches of two of the bridge arms connected to the same supply bus.

In the circuit arrangement according to the invention, the load current and its polarity are not determined during an operating state when energy is being fed into the load or energy is fed back from the load, which may be, for instance, a motor or generator. In an operating state, the load current flows via either pair of two diagonal bridge arms. The polarity and magnitude are not determined in this switching state because there is no magnetization of the current transformer core because either the current does not flow through both primary windings or both primary windings of the transformer core are magnetized equally opposite, so that the resultant core magnetization is zero. However, when the load current circulates in one of the two bypass circuits during a pause in the chopper drive, it flows in the primary winding of the current transformer disposed in that bypass circuit, which causes the transformer core to be magnetized. This causes a pulse-like current rise in the secondary winding. The polarity of this signal depends not only on the polarity of the load current but changes its sign depending on in which of the two bypass circuits the load current circulates. By the appropriate drive of the reversible d-c controller, the load current circulates in the bypass periods in alternating fashion in the two bypass circuits. By keyed rectification of the current transformer signal, a pulse train can be obtained, the polarity of which may be correlated unambiguously with the polarity of the load current. In order to rectify this signal, an operational amplifier can be used to advantage by operating it so that the current transformer output sigal is inverted in every second determination period and therefore in a time interval in which the load current circulates in the same predetermined bypass circuit. An unambiguous correlation of the polarity of the pulse train with the polarity of the load current can be obtained by means of the pattern of the drive signals for the electronic switches in the bypass circuits. Inexpensive a.c. transformers can be used in this circuit arrangement, thereby lowering costs. The polarity of the load current is determined at zero potential, because the measuring circuit is d-c separated via the current transformer from the power circuit. In addition, continuous measurement and determination of the current polarity is made during the pauses in the drive of the reversible d-c controller.

The circuit arrangement according to the invention can be modified to determine the magnitude of the load current as well as its polarity. To achieve this end, the operational amplifier is preferably the input of a sample-and-hold stage having an electronic sampling switch and at the output of which a signal is present which is representative of the magnitude and the polarity of the load current. The sampling switch is closed for a predetermined time interval during the time that the load current circulates in either of the two bypass circuits via digital logic circuitry coupled to the control signals of the electronic switches in the two bridge arms in one of the bypass circuits.

In this further embodiment, the polarity and magnitude are measured and evaluated in the sample-and-hold stage. Such sample-and-hold stages, also called instantaneous-value memories, are known, for instance, from the book "Halbleiterschaltungstechnik" (semiconductor circuit design), Springer-Verlag, 1974, pages 295 to 296. In order to evaluate the magnitude of the current, the electronic sampling switch is closed at an instant in which each of the pulses present at the secondary winding of the current transformer is representative of the magnitude of the load current.

BRIEF DESCRIPTION OF THE DRAWINGS

The invention will be explained in greater detail in the following detailed description by way of example, referring to the drawings, in which.

DETAILED DESCRIPTION

Figures 1, 2:
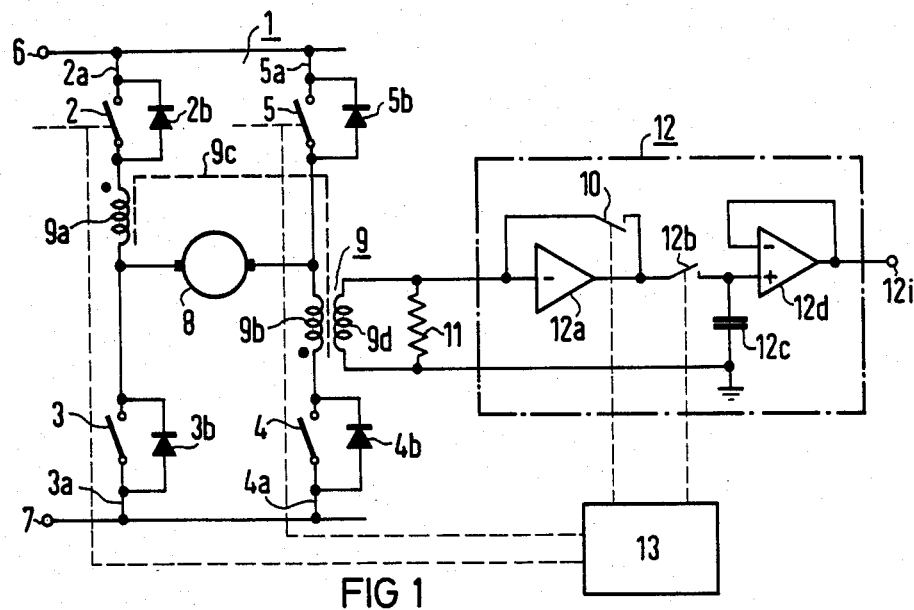
FIG. 1 is a schematic/block diagram of the circuit arrangement of the invention.
FIG. 2 is a schematic/block diagram illustrating a further embodiment of the arrangement and showing parts of FIG. 1 in greater detail.

With reference to the drawings, FIG. 1 shows schematically the design of the circuit arrangement according to the invention. In the power section 1, four electronic switches 2, 3, 4 and 5 arranged in a bridge circuit with bridge arms 2a, 3a, 4a and 5a are disposed across two input busses 6 and 7, to which the d-c supply voltage is applied. The electronic switches 2, 3, 4 and 5 may, for instance, be transistors. Each of the electronic switches 2, 3, 4 and 5 is respectively shunted by a bypass diode 2b, 3b, 4b or 5b, the diodes being polarized opposite the forward direction of the corresponding electronic switch, for instance, the associated transistor. In the bridge circuit, a d-c motor 8 is connected as the load between the junction point of the bridge arms 2a and 3a and the junction point of the bridge arms 5a and 4a. The bridge arms 2a and 5a form a first bypass circuit and bridge arms 3a and 4a form a second bypass circuit.

In order to determine the load current, a current transformer 9 having two primary windings 9a and 9b, a common core 9c and a secondary winding 9d is provided. The two primary windings 9a and 9b are connected with opposite winding sense into diagonal bridge arms 2a and 4a which have no common junction point. A load resistor 11 is connected across the secondary winding 9d of the current transformer 9.

The polarity of the current transformer output signal present across the resistor 11 depends not only on the polarity of the load current, but also changes its sign depending on whether the load current circulates in the bypass circuit formed by the bridge arms 2a and 5a or in that formed by the bridge arms 3a and 4a due to the opposite winding of the two primary windings. By keyed rectification of the current transformer output signal, i.e., by rectification in which an inverted current transformer output signal must always be ascribed to a load current circulating in the same bypass circuit, a rectified signal is obtained, the polarity of which corresponds, after proper correlation by means of the pulse train of the control signals for the switches 2, 3, 4 and 5, to the polarity of the load current.

In the example shown in FIG. 1, the keyed rectification is performed by an inverting operational amplifier 12a, the output of which is fed back via a further electronic switch 10 to the inverting input of the operational amplifier 12a. The electronic switch 10, which may, for instance, be an FET switch, is driven by logic circuit 13, to which are fed the control pulses of the electronic switches 2 and 5 arranged in the bridge arms 2a and 5a of the same bypass circuit. The electronic switch 10 is closed by the logic circuit 13 always when the load current circulates in the same predetermined bypass circuit thereby bypassing the inverting amplifier. Each current transformer output signal which corresponds to the circulation of the load current in one of the bypass circuits, is thereby inverted, while the polarity of the current transformer output signal which corresponds to the circulation in the other bypass circuit remains unchanged. In FIG. 1, when switch 10 is open, the signal is inverted, and when switch 10 is closed, the signal bypasses the amplifier and remains unchanged. The signal which represents the polarity of the load current is therefore present at the output of the operational amplifier 12a.

In the embodiment shown in FIG. 1, the circuit according to the invention is expanded for additionally determining the magnitude of the load current. To achieve this end, the operational amplifier 12a is used as the input stage of a sample-and-hold stage 12. In the schematically shown sample-and-hold stage 12, the operational amplifier 12a is followed by an electronic sampling switch 12b, which may, for instance, be an FET switch. The sampling switch 12b is connected to the storage capacitor 12c and the non-inverting input of a second operational amplifier 12d, which is connected as an impedance matching stage having the output 12i fed back to the inverting input and at the output 12i of which the actual load current value is present which represents the magnitude as well as the polarity of the load current. The sampling switch 12b is likewise driven by the logic circuit 13. The logic circuit 13, which comprises digital logic members and delay stages, will be discussed below, with reference to FIG. 2.

To explain the operation of the circuit arrangement according to FIG. 1, it must be assumed that the switches 2, 3 and 4, 5, respectively, can never be closed at the same time because otherwise short circuits would occur across the d-c bus. If energy is fed in, or in case the motor 8 is operated as a generator, fed back, the current always flows via the switches 2 to 5 of diagonal bridge arms 2a and 4a, or 3a and 5a, respectively, or through the corresponding bypass diodes 2b to 5b. In this mode of operation, the transformer core 9c is not magnetized, since either no current flows through both primary windings if the latter flows through the bridge arms 3a and 5a or, if current flows via the closed switches 2 and 4, both primary windings 9a and 9b magnetize the core 9c equally and oppositely, so that the resultant core magnetization is likewise zero. If it is assumed, for instance, that the switches 3 and 5 were closed and if one of these switches is opened to initiate a pause, then a current caused by the motor inductance is driven in the corresponding bypass circuit via the bypass diodes and switches and one of the primary windings 9a or 9b. This current causes the transformer core 9c to be magnetized, and this magnetization induces a pulse-like current rise in the secondary winding 9d. By the appropriate drive of the switches 2 to 5 it can be achieved that in the subsequent pause the load current circulates in the other bypass circuit and a pulse-like current rise of the opposite sign is thereby obtained in the secondary coil 9d. By means of the logic circuit 13, the electronic switch 10 of the operational amplifier 12a is closed in dependence on the control signals of the electronic switches 2 to 5 for the keyed rectification at every circulation of the load current in the same bypass circuit, whereby a pulse train comprising pulses all of the same polarity is obtained at the output of the operational amplifier 12a. In addition, the evaluation switch 12b of the sample-and-hold stage 12 is closed by the logic circuit 13 for a predetermined time whenever the load current circulates in either of the two bypass circuits. By means of time delay stages, the time for which the sampling switch 12b is closed is fixed so that the evaluation takes place at an instant when the narrow current pulses at the secondary winding 9d of the current transformer 9 are representative of the load current. At the output of the sample-and-hold stage, a signal is then present which corresponds to both the polarity and the magnitude of the motor current.

FIG. 2 shows a more detailed embodiment of the evaluation circuit and the logic circuit 13. As already described, the secondary winding 9d of the current transformer 9 is connected across the load resistor 11 and across series-connected oppositely polarized limiting Zener diodes 14 to the input of the sample-and-hold stage 12. The input to sample-and-hold stage 12 is connected via a resistor 12e to the inverting input and via a resistor 12h to the non-inverting input of the operational amplifier 12a, the output of which is fed back via the resistor 12f to the inverting input. The resistors 12e, 12h and 12f have the same resistance value. The non-inverting input of the operational amplifier 12a is connected via an electronic switch 10' to reference potential. This arrangement converts operational amplifier 12a into a ±1 unity gain amplifier. Switch 10' performs the same function as switch 10 of FIG. 1 but in the opposite sense. Thus, when switch 10' is closed, operational amplifier 12a operates as an inverting unity gain amplifier. When switch 10' is open, operational amplifier 12a operates as a non-inverting unity gain amplifier. The electronic switch 10' is driven by the logic circuit 13. The output of the operational amplifier 12a is followed by the evaluation switch 12b, to the output of which are connected storage capacitor 12c and the non-inverting input of impedance matching operational amplifier 12d. The control signals S2 and S5 of the electronic switches 2 and 5 are applied to the inputs 13a and 13b, respectively, of the logic circuit 13. Inputs 13a and 13b are connected to the inputs of NOR gate 13c and NAND gate 13d. To the output of the NOR gate 13c is connected an R-C differentiating state 13e the output of which is connected to the input of inverter 13g. The output of inverter 13g is tied to one input of a further NAND gate 13h. Additionally, the output of inverter 13g is coupled to the control input of electronic switch 10'. A further R-C differentiating stage 13f is coupled to the output of NAND gate 13d. The output of differentiating stage 13f is connected to the second input of the NAND gate 13h. To the output of the NAND gate 13h are series connected two time delay stages 13i and 13k which may be, for example, monostable multivibrators or single-shots. The output of the delay stage 13k is coupled to the control input of the electronic evaluation switch 12b. Time delay stages 13i and 13k are triggered by the leading edge of the pulse present at the output of the NAND gate 13h, and deliver a respectively delayed pulse of predetermined width, whereby the sampling time of the sample-and-hold stage 12 during each bypass period is set. The operation of the logic circuit 13 will be explained, referring to FIGS. 3 and 4, in greater detail below.

Figure 3:
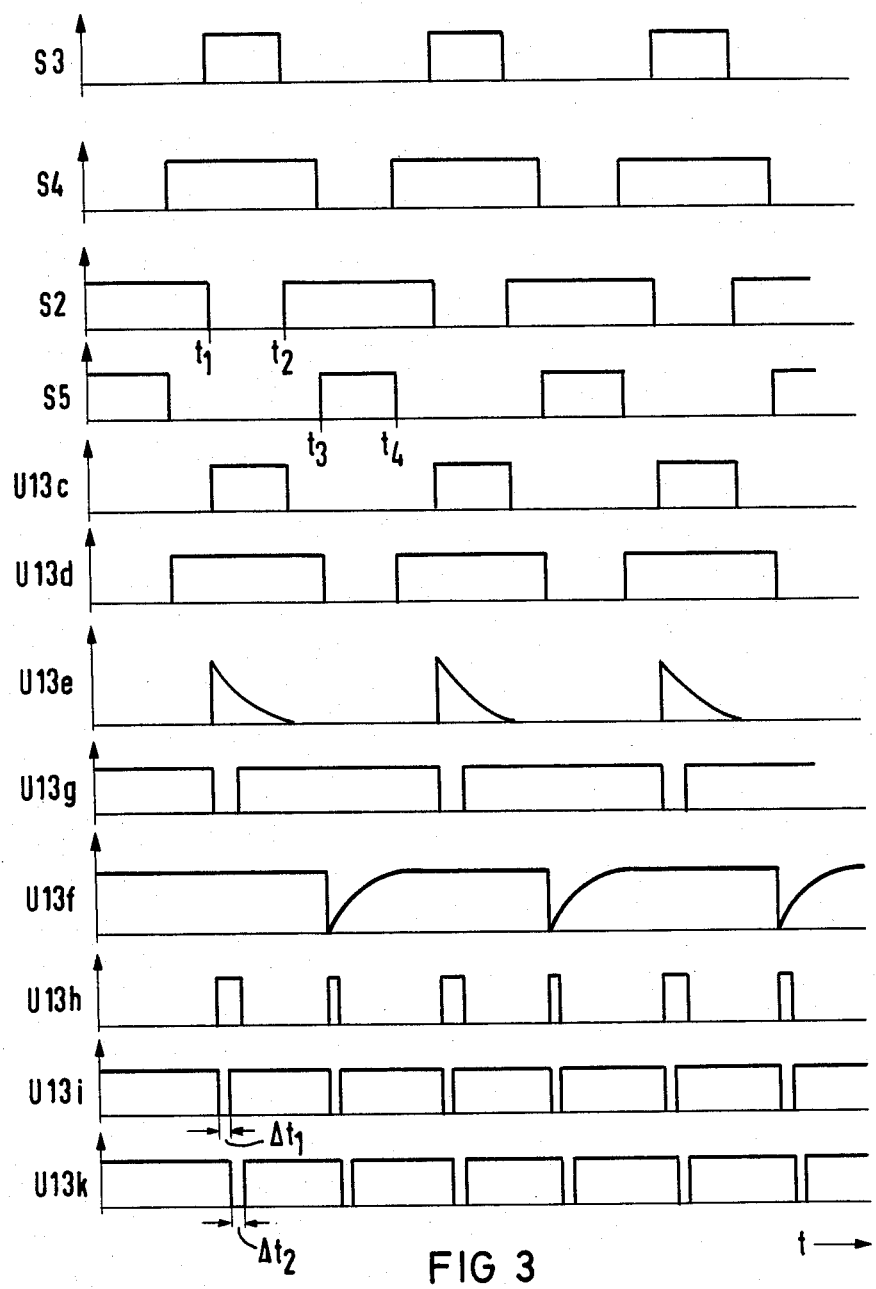
FIG. 3 is a timing diagram showing the signals present in the circuit of FIG. 2.
Figure 4:
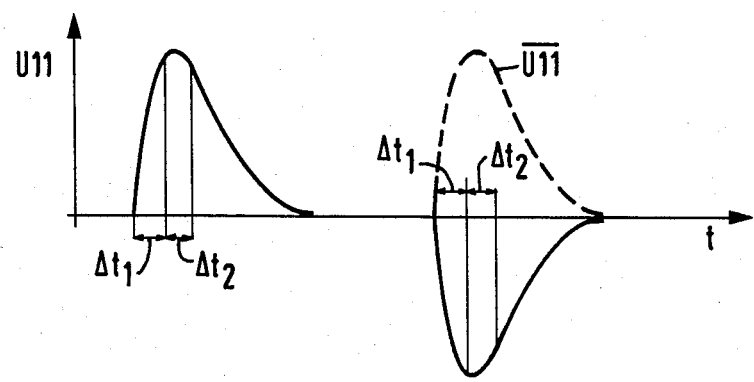
FIG. 4 is a further timing diagram showing signals present across the secondary winding of the current transformer of FIG. 2.

In FIG. 3, the control signals S2, S3, S4 and S5 of the electronic switches 2, 3, 4 and 5 and the output signals of the NOR gate 13c, the NAND gate 13d, the differentiating stages 13e and 13f, the inverter 13g, the NAND gate 13h and the delay stages 13i and 13k are shown versus time t. FIG. 4 shows two voltage pulses U11 across the load resistor 11 which are obtained if the load current circulates alternatingly in the two bypass circuits. The dashed curve indicates that the second voltage pulse is inverted in the manner described by means of the rectifying action of operational amplifier 12a.

In the following, it is assumed that control signals in the state "1" open the corresponding electronic switch in the bridge arms and close it in the state "0". From the time $t_1$ to the time $t_2$ of the pulse diagram of FIGS. 3 and 4, the load current therefore circulates in the bypass circuit which is formed by the bridge arms 2a and 5a via bypass diode 2b and switch 5. Switch 3 is open during this time. From the time $t_2$ to the time $t_3$ the load current flows via the closed switches 3 and 5. Switch 2 is open at this time. From the time $t_3$ to the time $t_4$, on the other hand, the load current circulates in the bypass circuit formed by the bridge arms 3a and 4a via switch 3 and bypass diode 4b. Both electronic switches 2 and 5 are open while electonic switches 3 and 4 are closed. By appropriately driving the electronic switches 2 to 5 as shown in FIG. 3, this alternating circulation of the load current in the two bypass circuits is repeated periodically.

At the leading edge of the pulse at the output of NOR gate 13c one obtains at the output of the differentiating state 13e the pulse U13e which is inverted in the inverter 13g. The switch 10' is closed by the signal U13g and the mentioned inversion of the current transformer signal U11 is thereby obtained. In the embodiment of FIG. 2, the signal U11 inverted by keyed rectification is associated with circulation of the load current in the bypass circuit which is formed by the bridge arms 2a and 5a. Furthermore, the signal U13g at the input of NAND gate 13h generates the pulse U13h, the leading edge of which triggers the first delay stage 13i to produce a pulse of length $\Delta t_1$. The trailing edge of pulse U13i generates in turn a pulse of length $\Delta t_2$ via delay stage 13k, thus causing the evaluation switch 12b to close. The length $\Delta t_1$ of the pulse U13i is matched, as shown in FIG. 4, to the rise time of the voltage pulse U11 and the length $\Delta t_2$ at the signal U13k is determined by a range in which the maximum of the voltage U11 is located. Both pulse lengths $\Delta t_1$ and $\Delta t_2$ are several msecs. long. It is thereby ensured that in the time interval $\Delta t_2$ a value representing the magnitude of the actual value of the load current is read into the storage capacitor 12c of the sample-and-hold stage 12 and is present at its output 12i. Thus signal U13g causes both the keyed inversion of signal U1l and the sampling of the current magnitude. In like manner, a differentiated pulse U13f is obtained at the trailing edge of the pulse U13d, which is present directly at the other input of the NAND gate 13h and closes the evaluation switch 12b in an analogous manner for the time $\Delta t_2$. The signal U13f does not influence switch 10', however, but, on the other hand, insures that the evaluation switch 12b is closed for each circulation of the load current in the other bypass circuit and a corresponding value of the current transformer secondary signal U1l is fed into the storage capacitor 12c.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a circuit arrangement for determining the polarity of the load current in a reversible d-c controller having a bridge circuit which is connected across a d-c supply voltage source, said bridge circuit having four bridge arms, respective pairs of said bridge arms being diagonally disposed in said bridge circuit, load current flowing to or from the d-c supply voltage source through the diagonally disposed bridge arms, each of said bridge arms including an antiparallel circuit comprising first electronic switch means and bypass diode means wherein two pairs of bridge arms respectively connected to the same bus of said supply voltage source each form a bypass circuit in which a measuring sensor is provided, said first electronic switch means controlled so that the load current circulates in successive time intervals in alternating fashion in the two bypass circuits, the improvement comprising:

a current transformer having two primary windings provided as measuring sensors, said primary windings connected in opposite winding sense in respective ones of said bypass circuits in two of said diagonally disposed bridge arms, said current transformer having a secondary winding connected across a load resistor;

operational amplifier means having said secondary winding coupled to the inverting and the non-inverting inputs thereof, the output of said operational amplifier means being coupled to the inverting input, the non-inverting input of said operational amplifier means coupled to further electronic switch means to reference potential;

digital logic means coupled to said first electronic switch means; and said further electronic switch means controlled by said digital logic means in dependence on the control signals from said first electronic switch means so that said further electronic switch means causes said operational amplifier means to operate as an inverting amplifier in every time interval in which the load current circulates in the same predetermined bypass circuit.

2. The improvement recited in claim 1, further comprising means for determining the magnitude of the load current.

3. The improvement recited in claim 2 wherein said means for determining comprises sample-and-hold means, said operational amplifier means provided as the input to said sample-and-hold means, said sample-and-hold means including electronic sampling switch means, said sampling switch means controlled by said digital logic means, said digital logic means closing said sampling switch means in dependence on the control signals from said first electronic switch means during a predetermined time in each time interval when the load current circulates in either of the two bypass circuits.

4. In a circuit arrangement for determining the polarity of the load current in a reversible d-c controller having a bridge circuit which is connected across a d-c supply voltage source, said bridge circuit having four bridge arms, respective pairs of said bridge arms being diagonally disposed in said bridge circuit, load current flowing to or from the d-c supply voltage source through the diagonally disposed bridge arms, each of said bridge arms including an antiparallel circuit comprising first electronic switch means and bypass diode means wherein two pairs of bridge arms respectively connected to the same bus of said supply voltage source each form a bypass circuit in which a measuring sensor is provided, said first electronic switch means controlled so that the load current circulates in successive time intervals in alternating fashion in the two bypass circuits, the improvement comprising:

a current transformer having two primary windings provided as measuring sensors, said primary windings connected in opposite winding sense in respective ones of said bypass circuits in two of said diagonally disposed bridge arms, said current transformer having a secondary winding connected across a load resistor;

digital logic means coupled to said first electronic switch means; and keyed rectification means having an input coupled to said secondary winding and controlled by said digital logic means in dependence on the control signals from said first electronic switch means so that said keyed rectification means inverts signals from the secondary winding in every time interval in which the load current circulates in the same predetermined bypass circuit.

5. The improvement recited in claim 4 wherein said keyed rectification means comprises:

operational amplifier means, the secondary winding being coupled to the inverting and non-inverting inputs of said operational amlifier means, the output of said operational amplifier means coupled to the inverting input;

further electronic switch means coupling the non-inverting input to reference potential;

whereby said further electronic switch means is controlled by said digital logic means in dependence on the control signals from said first electronic switch means so that said further electronic switch means causes said operational amplifier means to operate as an inverting amplifier in every time interval in which the load current circulates in the same predetermined bypass circuit.

6. The improvement recited in claim 5, further comprising means for determining the magnitude of the load current.

7. The improvement recited in claim 6 wherein said means for determining comprises sample-and-hold means, said operational amplifier means provided as the input to said sample-and-hold means, said sample-and-hold means including electronic sampling switch means, said sampling switch means controlled by said digital logic means, said digital logic means closing said sampling switch means in dependence on the control signals from said first electronic switch means during a predetermined time in each time interval when the load current circulates in either of the two bypass circuits.

* * * * *